United States Patent
Arnold et al.

[11] Patent Number: 5,877,467
[45] Date of Patent: Mar. 2, 1999

[54] CIRCUIT BREAKER CURRENT LIMITING ARC RUNNER

[75] Inventors: David Arnold, Chester, Conn.; Anil R. Duggal, Niskayuna; Lionel M. Levinson, Schenectady, both of N.Y.

[73] Assignee: General Electric Company, Schenectady, N.Y.

[21] Appl. No.: 797,152

[22] Filed: Feb. 10, 1997

Related U.S. Application Data

[63] Continuation-in-part of Ser. No. 514,076, Aug. 11, 1995, Pat. No. 5,614,881.

[51] Int. Cl.$^6$ .................................................. H01H 33/20
[52] U.S. Cl. ............................................. 218/148; 218/36
[58] Field of Search .......................... 218/15, 22, 29–40, 218/148–151; 335/16, 132, 133, 196, 201, 202; 337/2, 4, 5, 8, 9, 142, 148, 150

[56] References Cited

U.S. PATENT DOCUMENTS

| | | | |
|---|---|---|---|
| 2,933,574 | 4/1960 | Frink | 200/144 |
| 4,511,772 | 4/1985 | Link et al. | 200/144 R |
| 4,649,455 | 3/1987 | Scott | 361/93 |
| 4,652,975 | 3/1987 | Scott | 361/404 |
| 4,754,247 | 6/1988 | Raymont et al. | 335/202 |
| 4,764,650 | 8/1988 | Bur et al. | 200/153 G |
| 4,789,848 | 12/1988 | Castonguay et al. | 335/167 |
| 4,806,893 | 2/1989 | Castonguay et al. | 335/20 |
| 4,963,849 | 10/1990 | Kowalczyk et al. | 335/201 |
| 4,970,481 | 11/1990 | Arnold et al. | 335/6 |
| 5,373,273 | 12/1994 | Guery et al. | 335/201 |
| 5,495,083 | 2/1996 | Aymami-Pala et al. | 218/1 |
| 5,539,370 | 7/1996 | Arnold | 337/8 |
| 5,614,881 | 3/1997 | Duggal et al. | 338/22 R |

*Primary Examiner*—Michael A. Friedhofer
*Attorney, Agent, or Firm*—Fishman, Dionne, Cantor & Colburn; Carl B. Horton

[57] ABSTRACT

A circuit breaker is equipped with a current limiting arc runner for effective overcurrent interruption without additional heating under quiescent operating conditions. Upon contact separation, an arc is drawn with the endpoints of the arc being initially rooted on the set of open contacts. Further opening of the contacts commutates the arc onto the current limiting arc runner to suppress the circuit current.

8 Claims, 2 Drawing Sheets

CIRCUIT BREAKER CURRENT LIMITING ARC RUNNER

CROSS REFERENCE TO RELATED APPLICATIONS

This is a continuation-in-part of application Ser. No. 08/514,076, filed Aug. 11, 1995, now U.S. Pat. No. 5,614,881.

BACKGROUND OF THE INVENTION

A variety of overcurrent protective devices for circuit protection and isolation, including contactors, fuses and circuit breakers are currently employed for electrical distribution and control. State of the art circuit breakers include various means to limit the inrush current to predetermined values. U.S. Pat. No. 4,963,849 entitled "Compact Current Limiting Circuit Breaker", for example, describes an electronic current limiting circuit breaker that utilizes a compact slot motor and compact arc chute to minimize and control the arc when the circuit breaker contacts become separated upon intense overcurrent conditions. U.S. Pat. No. 4,970,481 entitled "Current Limiting Circuit Breaker Contact Arm Configuration" describes a current limiting circuit breaker contact arm configuration that includes an arc runner for rapidly directing the arc current into the arc chute.

Current limitation within circuit interruption devices is achieved by rapidly accelerating the movable contact arms through an open gap, and efficiently driving the arc into the arc chute wherein the short circuit current is suppressed and extinguished. Articulation of the contact arms under current limiting conditions is independent of the state of the interrupting mechanism, and results primarily from the extremely high magnetic forces generated from the high inrush current. With linear acceleration of the contact arms being dependent on mass, and rotary acceleration on inertia, it follows that a large contact arm will require more force than a small contact arm to open to a specified gap within the same period of time. This process of current limiting produces low $I^2t$ let-through energies in low ampere rated devices with small contact arms, and high $I^2t$ let through energies in high ampere rated devices with large contact arms. Consequently, the degree of protection afforded high ampere-rated protected circuits is limited by the size of the movable contact arms within the current limiting circuit breaker.

A method of enhancing the current limiting characteristics of high ampere rated circuit breakers is described in U.S. Pat. No. 5,539,370 entitled "Inductive Motor Protective Circuit Breaker Unit" wherein the movable contact arms are electrically connected in parallel with a positive temperature coefficient of resistance (PTCR) device and an ohmic resistor. Upon the occurrence of a short circuit overcurrent, the movable contact arms rapidly open to transfer the current into the parallel combination of the PTCR device and ohmic resistor, thereby achieving current limitation before the circuit breaker contacts become completely separated to isolate the protected circuit. Under quiescent operating conditions, the load circuit current passes primarily through the low impedance movable contact arms to thereby minimize the heat generated by the current suppressing unit. The inclusion of parallel-connected movable contact arms offers an effective means for providing current limiting in high ampere-rated circuit breakers with some additional cost and complexity.

A low cost current suppressing circuit breaker is described in U.S. patent application Ser. No. 08/797,151 entitled "Current Suppressing Circuit Breaker Unit for Inductive Motor Protection" (filed concurrently herewith). Therein, a polymer current limiting device operating in a manner described in U.S. patent application Ser. No. 08/514,076 filed 11 Aug. 1995, entitled "Current Limiting Device" is electrically connected in series with the circuit breaker contacts to rapidly suppress the short circuit current until the circuit breaker responds to isolate the protected circuit. However, under quiescent operating conditions, the polymeric material within the polymer current limiter dissipates $I^2R$ power, which consequently limits the steady state current rating of the device.

Accordingly, it would be economically advantageous to have a low cost, high ampere-rated current limiting circuit breaker that does not exhibit such $I^2R$ quiescent power losses.

One purpose of the invention is to provide a circuit breaker with a current limiting arc runner to rapidly suppress the short circuit current before the circuit breaker contacts isolate the protected circuit, without incurring $I^2R$ power loss under quiescent operating conditions.

SUMMARY OF THE INVENTION

A high ampere-rated circuit breaker employs a current limiting arc runner for rapid suppression of an overcurrent before the circuit breaker contacts fully open to isolate the protected circuit. Proximity of the current limiting arc runner to the movable contact arms promotes commutation of the arc current to the arc runner during contact separation. The polymeric material in the arc runner rapidly suppresses the overcurrent during short circuit interruption without generating heat under quiescent circuit conditions.

DESCRIPTION OF THE PREFERRED EMBODIMENT

Figure 1:
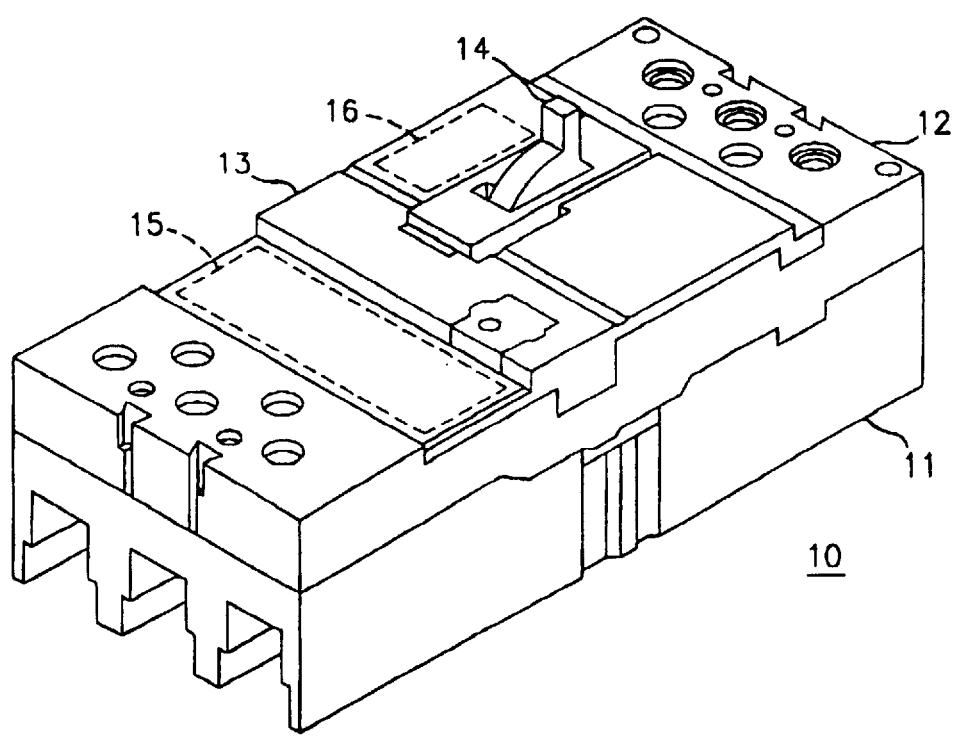
FIG. 1 is a top perspective view of a high ampere-rated current limiting circuit breaker employing the current limiting arc runner according to the invention;.

FIG. 1 shows a high ampere rated current limiting circuit breaker 10 which operates as described in aforementioned U.S. Pat. No. 4,963,849. The circuit breaker includes a circuit breaker case 11, circuit breaker cover 12 and accessory cover 13 as described in U.S. Pat. No. 4,754,247 entitled "MCCB Accessory Enclosure", which is attached on opposite sides of the operating handle 14 and encloses trip actuator 16. The electronic trip unit 15 contained within the cover is described in U.S. Pat. No. 4,649,455 entitled "Rating Plug for MCCB".

Figure 2:
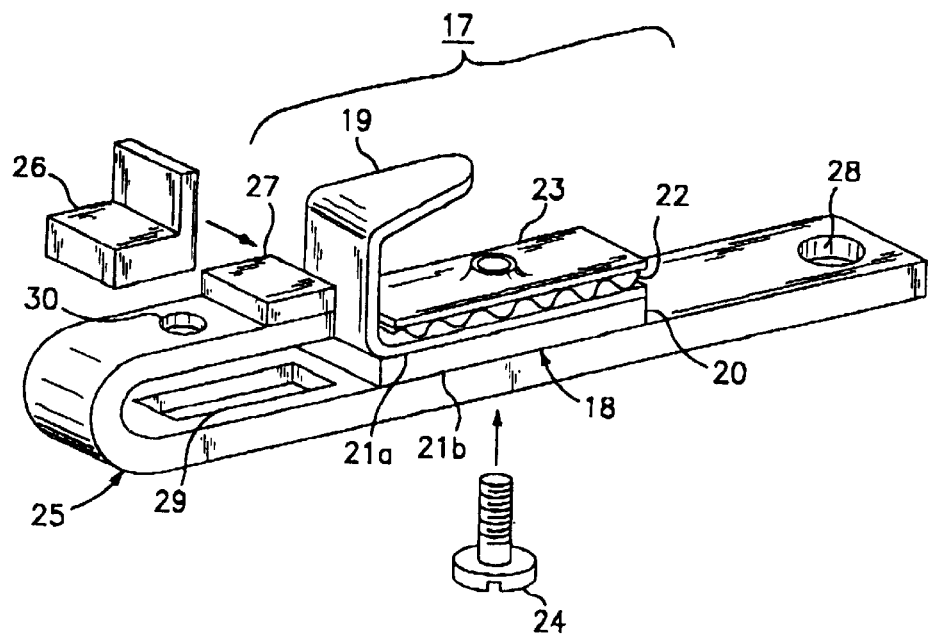
FIG. 2 is a top perspective view of the current limiting arc runner in the circuit breaker of FIG. 1.

FIG. 2 shows the current limiting arc runner 17 comprising a current limiting device 18, which operates in a manner described in aforementioned U.S. patent application Ser. No. 08/514,076, and an arc rail 19. The current limiting device 18 comprises a polymeric conductor 20 with abutting electrode surfaces 21a, 21b, a spring 22 for exerting a compressive force between the electrode surfaces and the polymeric conductor, and a support plate 23 with retainer screw 24 for maintaining a specified compressive load on the spring 22. Electrode surface 21a is integral with the arc rail 19, and electrode surface 21b is an integral part of the line strap 25.

Current limiting arc runner 17 is secured within circuit breaker case 11 by fastening means known in the art, e.g., an interference fit between support plate 23 and circuit breaker case 11. An insulator 26 maintains an arc gap between the fixed contact 27 and arc rail 19. A terminal hole 28 is provided at one end of the line strap 25 for making electrical contact to the protected circuit. A support hole 29 is provided at the other end of the line strap 25 for securement of the line strap to the circuit breaker case 11 by means of a fastening screw, not shown, being inserted through a mounting hole 30, and being fastened to the line strap support 31 as best seen by referring to FIG. 3.

Figure 3:
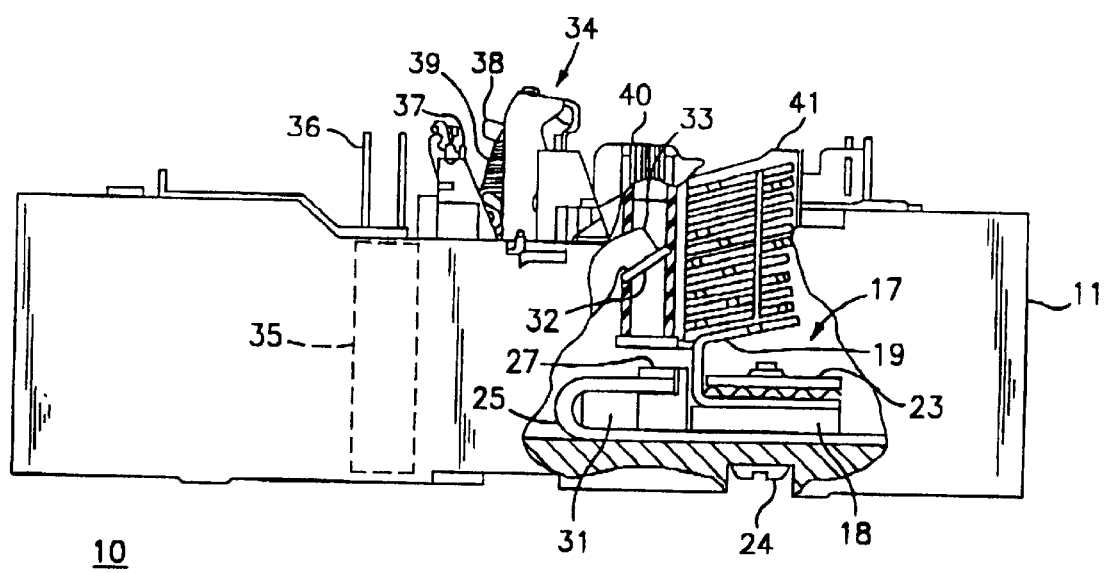
FIG. 3 is a partial side section view of the current limiting arc runner of FIG. 2 within the circuit breaker of FIG. 1.

FIG. 3 shows the incorporation of the current limiting arc runner 17 of FIG. 2 into the high ampere rated current limiting circuit breaker 10 of FIG. 1. The line strap 25 is attached to the line strap support 31 of the circuit breaker case 11, using fastening means not shown. The current limiting arc runner 17 is attached to the line strap 25 using retainer screw 24. The retainer screw 24, electrically isolated from the line strap 25 and current limiting device 18 by insulation means not shown, is assembled through the circuit breaker case 11 and into the threaded support plate 23. A movable contact 32, attached to contact arm 33, cooperates with the fixed contact 27 when the switching mechanism 34, operating in a manner described in U.S. Pat. No. 4,789,848 entitled "MCCB Latch & Operating Mechanism Assembly", articulates the contact arm 33 to close on the protected circuit. An overcurrent condition in the protected circuit is sensed by means of individual pole current transformers, one of which is depicted by 35 for purposes of this disclosure. A calibrated output signal from the current transformer 35 is communicated to the trip unit 15, shown in FIG. 1, by means of connector pins 36 as described in U.S. Pat. No. 4,652,975 entitled "Mounting Arrangement for Circuit Breaker Current Sensing Transformers". The trip unit 15 interacts with the switching mechanism 34 by means of the trip actuator 16, shown in FIG. 1 and described in U.S. Pat. No. 4,806,893 entitled "MCCB Actuator-Accessory Unit". Upon the operation of the trip actuator 16, the trip latch 37 releases the trip cradle 38, which allows the mechanism springs 39 to drive the contact arm 33 to the open position. A slot motor 40 enhances the opening speed of the contact arm 33, and assists in driving the electrical arc, not shown, onto the arc rail 19 and into the arc chute 41 during the interruption process of the overcurrent condition.

Under quiescent operating conditions with the switching mechanism in the closed position, the circuit current passes through the line strap 25, fixed contact 27, movable contact 32, contact arm 33, and load conductors, not shown, to the protected circuit. None of the circuit current passes through the current limiting arc runner or the polymeric conductor under quiescent operating conditions. Under overcurrent conditions with the contact arm 33 traversing from closed to open position, the electrical arc that is established prior to current extinction commutates onto the current limiting arc runner 17 and into the arc chute 41. The current is rapidly suppressed by the current limiting arc runner 17, and subsequently extinguished by the arc chute 41 to isolate the protected circuit.

A high ampere rated current limiting circuit breaker has herein been described having a current limiting arc runner for commutation of an electric arc during an overcurrent interruption process. The current limiting arc runner provides the high ampere rated current limiting circuit breaker with the means to rapidly suppress the current in an overcurrent condition without generating $I^2R$ heating during quiescent operating conditions.

We claim:

1. A high ampere rated compact current limiting circuit breaker comprising:

a circuit breaker housing;

at least one contact arm with a first contact, and at least one line strap with a second contact within said circuit breaker housing for interrupting circuit current within a first current path;

a trip unit within the circuit breaker housing for initiating separation of said first and second contacts upon the occurrence of an abnormal current in a protected circuit;

an operating means within the circuit breaker housing for articulation of said first and second contacts;

at least one current limiting arc runner having an arc rail and a current limiting device comprising at least one polymeric electrically-conducting material which does not require a PTCR effect, whereby said arc rail is arranged proximate said second contact for commutating an arc, which is generated when said first and second contacts become separated, into a second current path that includes said current limiting device for rapid suppression of the circuit current; and a fastening means to secure said current limiting arc runner within said circuit breaker housing.

2. The circuit breaker of claim 1 wherein said current limiting device comprises:

first and second electrodes;

at least one polymeric conducting material between said first and second electrodes, said material comprising a) a polymeric binder with a pyrolysis or vaporization temperature at which significant gas evolution occurs, below 800 degrees C., and b) an electrically conductive filler;

at least one interface positioned perpendicular to a direction of current flow and having a much higher resistivity than an average resistivity of said current limiting device, whereby, during a short circuit, adiabatic resistive heating at said interface causes a rapid thermal expansion and vaporization of said polymeric binder, resulting in at least a partial physical separation at said interface; and means for exerting compressive pressure on said polymeric conducting material.

3. The circuit breaker of claim 2 wherein said arc rail and said first electrode are electrically connected.

4. The circuit breaker of claim 2 wherein said second electrode is integral with said line strap.

5. The circuit breaker of claim 3 wherein said arc rail and said first electrode are integral and generally U-shaped to provide a reverse direction for the current path.

6. The circuit breaker of claim 2 wherein said compressive means comprises a spring.

7. The circuit breaker of claim 1 wherein said fastening means comprises a support plate disposed on said arc runner; and at least one screw for fastening said support plate and said arc runner to said circuit breaker housing.

8. The circuit breaker of claim 1 further including an insulator positioned between said second contact and said current limiting arc runner for maintaining an arc gap.

* * * * *